US008352401B2

United States Patent
Cheng et al.

(10) Patent No.: US 8,352,401 B2
(45) Date of Patent: Jan. 8, 2013

(54) INCORPORATING REPRESENTATIONAL AUTHENTICITY INTO VIRTUAL WORLD INTERACTIONS

(75) Inventors: Tsz S. Cheng, Grand Prairie, TX (US); Gregory P. Fitzpatrick, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 12/420,641

(22) Filed: Apr. 8, 2009

(65) Prior Publication Data
US 2010/0262572 A1  Oct. 14, 2010

(51) Int. Cl.
*G06F 17/00* (2006.01)
*G06N 5/02* (2006.01)

(52) U.S. Cl. .......................................................... 706/47
(58) Field of Classification Search ...................... 706/47
See application file for complete search history.

(56) References Cited

U.S. PATENT DOCUMENTS 7,016,940 B2 * 3/2006 Matsuda et al. .............. 709/206
2007/0113181 A1 * 5/2007 Blattner et al. ............... 715/706
2009/0309891 A1 * 12/2009 Karkanias et al. ............ 345/581

OTHER PUBLICATIONS

Lyons, Michael et al "Avatar Creation Using Automatic Face Processing" ACM multimedia 1998. [Online] DOwnloaded Mar. 14, 2012. http://delivery.acm.org/10.1145/300000/290816/p427-lyons.pdf?ip=151.207.242.4&acc=ACTIVE%20SERVICE &CFID=70521915&CFTOKEN=91209202&_acm_ =1331769332_ae39c238fecec24f12a3e41fba331331.*

* cited by examiner

*Primary Examiner* — Ben Rifkin
(74) *Attorney, Agent, or Firm* — Patents on Demand P.A.; Brian K. Buchheit; Scott M. Garrett

(57) ABSTRACT

A system that incorporates representational authenticity into virtual world interactions can include user representational authenticity data and a virtual world computing system. The user representational authenticity data can be used to describe the physical characteristics of a human user. The physical characteristics can be quantified utilizing standardized measurement techniques. The virtual world computing system can be configured to adjudicate the conduction of interactions performed by a virtual representation of the human user within the virtual world environment utilizing the user representational authenticity data.

20 Claims, 4 Drawing Sheets

INCORPORATING REPRESENTATIONAL AUTHENTICITY INTO VIRTUAL WORLD INTERACTIONS

BACKGROUND

The present invention relates to the field of virtual world computing and, more particularly, to incorporating representational authenticity into virtual world interactions.

Virtual world environments are a popular form of social networking applications that provide users with the ability to interact with others in a variety of settings. Users are allowed to create graphical virtual representations of themselves that they utilize to interact with the various elements of the virtual world environment, such as stores, games, and the virtual representations of other uses. Many virtual world environments provide users with a wide variety of graphical options to customize the appearance of their virtual representation, also referred to as an avatar.

However, the freedoms afforded users when creating avatars allows for misrepresentation. That is, the graphical appearance displayed by a user's avatar need not accurately reflect the user's actual appearance. The anonymity afforded by this dissociation between the user's virtual and actual appearance permits some users to conduct interactions within the virtual world under false pretenses. For example, cyber-predators have been known to create child-like avatars to interact with the avatars of real children.

Typical approaches to combat such misrepresentation have focused on user-entered information, such as birth date, when creating an account for the virtual world environment. However, this information is easily faked by the user. This is also true of approaches that require submission of a photograph to associate with the user account. Conventional virtual world environments are unable to validate and/or quantify the differences between a user's virtual and actual appearances.

BRIEF SUMMARY

One aspect of the present invention can include a system that incorporates representational authenticity into virtual world interactions. Such a system can include user representational authenticity data and a virtual world computing system. The user representational authenticity data can be used to describe the physical characteristics of a human user. The physical characteristics can be quantified utilizing standardized measurement techniques. The virtual world computing system can be configured to adjudicate the conduction of interactions performed by a virtual representation of the human user within the virtual world environment utilizing the user representational authenticity data.

Another aspect of the present invention can include a method that utilizes representational authenticity data when handling virtual world interactions. Such a method can begin with the identification of an interaction of a virtual representation of a human user within a virtual world environment that utilizes representational authenticity requirements, which can be based upon user representational authenticity data. The user representational authenticity data can describe quantifiable physical characteristics of the human user. The interaction can be conducted with the virtual representation of another human user and/or a distinct location of the virtual world environment. The user representational authenticity data associated with the human user can then be accessed from a user profile. It can then be determined if the user representational authenticity data satisfies the representational authenticity requirement. When the representational authenticity requirements are satisfied, the interaction of the virtual representation of the human user within the virtual world environment can be permitted.

Yet another aspect of the present invention can include a virtual world environment that utilizes representational authenticity data when handling virtual world interactions. The virtual world environment can include user representational authenticity data, a virtual world computing system, and a representational authenticity handler. The user representational authenticity data can describe physical characteristics of a human user that can be quantified utilizing standardized measurement techniques. The virtual world computing system can be configured to present a virtual world environment in which a virtual representation of the human user interacts with the virtual representation of other human users and/or the virtual world environment. The representational authenticity handler can be configured to utilize the user representational authenticity data to determine which interactions the virtual representation of the human user is allowed to perform within the virtual world environment.

DETAILED DESCRIPTION

Figure 1:
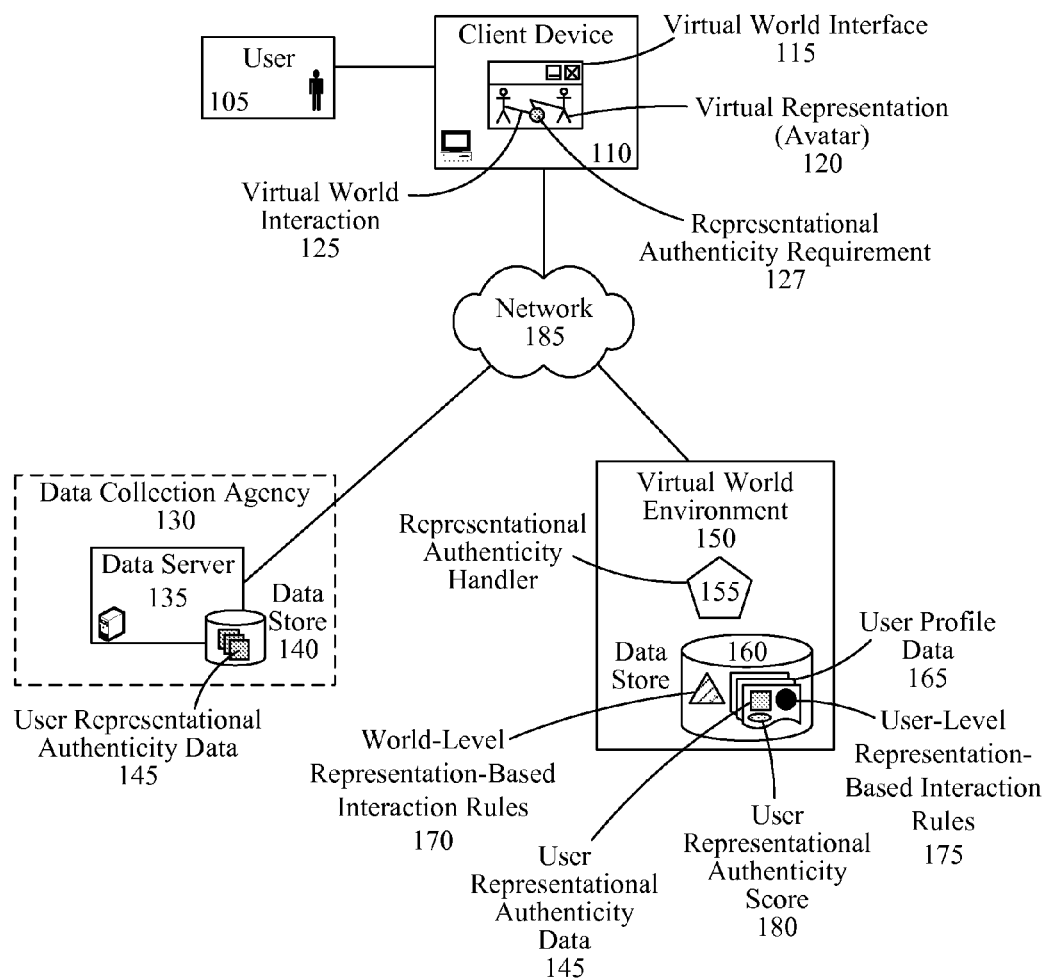
FIG. 1 is a schematic diagram illustrating a system that incorporates representational authenticity into interactions performed by virtual representations in a virtual world environment in accordance with embodiments of the inventive arrangements disclosed herein.

The present invention discloses a solution that incorporates user representational authenticity into virtual interactions. Representational authenticity can define how closely a user's virtual representation in the virtual world corresponds to the user's actual appearance. A user's representational authenticity can be represented by corresponding user representational authenticity data, which can be collected and validated by a third-party agency and/or by automated mechanisms. When the user attempts to perform various interactions within the virtual world environment, a representational authenticity handler can utilize the user representational authenticity data to determine how the interaction should proceed. That is, the interactions that a user attempts to perform can be allowed, modified, and/or rejected based upon the values of their user representational authenticity data. The conditions that define how interactions should be handled can be defined as representation-based interaction rules at the user-level and/or world-level.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that incorporates representational authenticity into interactions 125 performed by virtual representations 120 in a virtual world environment 150 in accordance with embodiments of the inventive arrangements disclosed herein. As used herein, the term "representational authenticity" is used to refer to how truthfully the user 105 represents themselves with their virtual representation 120 within the virtual world environment 150.

In system 100, the user 105 can utilize a virtual representation 120 of themselves, also referred to as an avatar, to perform interactions 125 within the virtual world environment 150 using a virtual world interface 115. SECOND LIFE is one example of a virtual world interface. Other examples of interface 115 can include, but are not limited to interfaces of massively multiplayer online role-playing games (MMOR- PGs), GAIA ONLINE, WEEWORLD, FRENZOO, MEEZ, and the like. The client device 110 can represent a variety of electronic computing devices capable of running the virtual world interface 115 and communicating with the virtual world environment 150 over the network 185. Computing device 110 can include a processor, non-volatile memory, volatile memory, and bus, as well as network adaptors and input/output peripherals. The virtual world interface 115 can be a software application configured to provide the user 105 with the means to perform various functions within the virtual world environment 150.

As is typical in a virtual world environment 150, the virtual world interface 115 can allow a virtual representation 120 of the human user 105 to interact with other elements presented within the virtual world. The virtual representation 120 can be a graphical figure created and controlled by the user 105 within the virtual world environment 150. For example, the user 105 can use their virtual representation 120 to sit at a virtual table in a virtual library to read a virtual book.

The virtual world interactions 125 can represent the operations and/or actions that occur within the virtual world environment 150. These interactions 125 can occur between virtual representations 120 and/or elements of the virtual world environment 150, such as a sign or chair. Unlike a conventional virtual world environment 150, the interactions 125 of system 100 can include one or more representational authenticity requirements 127.

A representational authenticity requirement 127 can represent a condition that can influence how the interaction 125 is performed based upon its evaluation. Representational authenticity requirements 127 can be captured within the virtual world environment 150 as representation-based interaction rules 170 and 175. The representation-based interaction rules 170 and 175 can be configured at either the world or user level, respectively. For example, a user 105 can utilize the virtual world interface 115 to create a user-level representation-based interaction rule 175 to ignore chat requests from other users 105 who do not meet specific representational authenticity conditions.

It should be emphasized that not all interactions 125 conducted within the virtual world environment 150 are required to have representational authenticity requirements 127. For example, entry to a virtual library may not have representational authenticity requirements 127; all users 105 can enter the library. However, the children's reading area of the library can have representational authenticity requirements 127 based on age; only users 105 who meet the age requirement can enter the children's reading area.

Evaluation of the representational authenticity requirements 127 and, therefore, the representation-based interaction rules 170 and 175 can utilize user representational authenticity data 145 associated with the users 105 involved in the interaction 125. The user representational authenticity data 145 can represent data elements that quantify certain physical characteristics of the user 105. Examples of user representational authenticity data 145 can include, but are not limited to, height, weight, eye color, date of birth, body measurements, hair color, tattoos, body-piercings, and the like.

The user representational authenticity data 145 can be captured in the data store 140 of a data collection agency 130. The data collection agency 130 can be a third-party organization contracted by the corporate entity controlling the virtual world environment 150 to collect and verify user representational authenticity data 145. Collection of the user representational authenticity data 145 can utilize standardized measurement techniques and can require the user 105 to present themselves, in-person, at the data collection agency 130 with additional official identification documents.

In one embodiment, the agency 130 can be entirely automated, such as when a photo submitted by a user is automatically compared using video analysis techniques to characteristics of the avatar. Further authentication can occur, such as by IP location tracking a user to ensure that a named user or a user having asserted characteristics is actually geographically located at a residence in which the device 110 is located. Any authentication technique can be utilized, where authentication information used by agency 130 can remain confidential.

It should be emphasized that the embodiment of the present invention differs from the data collection and/or usage practices of current virtual world environments 150 due to the validation of the user representational authenticity data 145 by the data collection agency 130. That is, because the user 105 is required to submit themselves and identification documents to the data collection agency 130, the collected user representational authenticity data 145 can be determined to have a higher level of trust than similar data elements collected by more anonymous methods, such as a generic Web page.

For example, a user 105 can be required to provide a copy of their birth certificate and photo identification to verify their age. Thus, a parent can feel more confident that their child 105 will only be exposed to other users 105 in the children's area of the library who have been verified as children, regardless of the graphical appearance of their virtual representation 120.

Additionally, the type and/or amount of user representational authenticity data 145 collected for a user 105 can be graduated. For example, a user 105 can elect to have data elements categorized as "Basic", such as height and weight, whereas additional data elements, such as body fat percentage and MYERS-BRIGG personality profile, can be collected for a user 105 purchasing an "Advanced" collection package. It should be noted that the actual collection of user representational authenticity data 145 is not a focus for this embodiment of the present invention.

The various levels of user representational authenticity data 145 collected can affect the user's 105 ability to interact within the virtual world environment 150. That is, a user 105 missing certain detailed user representational authenticity data 145 can be automatically discounted by the user-level representation-based interaction rules 175 of other users 105. For example, because User Bob 105 did not opt to have his body fat percentage measured, User Jane's 105 user-level representation-based interaction rule 175 for ignoring others whose body fat percentage is greater than 40% will automatically reject User Bob's 105 chat requests.

Additionally, the user representational authenticity data 145 can be used as the basis for creating the user's 105 virtual representation 120 within the virtual world environment 150. The virtual world environment 150 can include an option that can apply the values of the user representational authenticity data 145 to the user's 105 existing virtual representation 120. For example, the height of the virtual representation 120 within the virtual world environment 150 can be adjusted to match the actual height of the user 105.

The data store 140 containing the user representational authenticity data 145 can be associated with a data server 135 of the data collection agency 130. The user representational authenticity data 145 can be electronically transmitted to the virtual world environment 150 from the data server 135 of the data collection agency 130 utilizing standard electronic communication protocols. The virtual world environment 150 can store the user representational authenticity data 145 within the user profile data 165 associated with the user 105.

The virtual world environment 150 can represent the hardware and software components necessary to simulate a virtual world in which users 105 can participate via various interactions 125. The virtual world environment 150 can include a variety of such standard components, such as servers (not shown), in various configurations. It should be noted that it is assumed that the virtual world environment 150 contains such standard components to support operation of the virtual world, and, that such standard components are configured in such a manner to interface with the components of the embodiment of the present invention.

In addition to the standard components, the virtual world environment 150 can include a representational authenticity handler 155 and a data store 160 that can contain user profile data 165 and world-level representation-based interaction rules 170. The representational authenticity handler 155 can represent a software application configured to manage the execution of interactions 125 having representational authenticity requirements 127. The representational authenticity handler 155 can utilize the user representational authenticity data 145 for the user 105 to evaluate the representational authenticity requirements 127 for the interaction 125 and, based on the evaluation, determine how the interaction 125 should be conducted.

Building upon the previous examples, the interaction 125 for entering the children's reading area of the library can have a representational authenticity requirement 127 requiring a maximum age of twelve to enter. The representational authenticity handler 155 can check the user representational authenticity data 145 for all users 105 attempting to enter the children's reading area. The virtual representation 120 of users 105 determined to be older than twelve based on the age contained in their user representational authenticity data 145 can be denied access to the children's reading area Additionally, the representational authenticity handler 155 can utilize a preset algorithm upon the user representational authenticity data 145 to calculate a user representational authenticity score 180. The user representational authenticity score 180 can numerically quantify the degree of representational authenticity between the user's 105 collected user representational authenticity data 145 and their virtual representation 120.

For example, users 105 who do not desire to apply representational authenticity concepts to their virtual representation 120 and, therefore, have no user representational authenticity data 145, would have a user representational authenticity score 180 of zero or "unknown". Thus, users 105 interacting with such a user 105 would be aware that the presented virtual representation 120 may bear no resemblance to the actual user 105.

The virtual world environment 150 can be configured to allow a user's 105 user representational authenticity score 180 to be displayed to other users 105. Additionally, the user representational authenticity score 180 can be utilized as a representational authenticity requirement 127 for representation-based interaction rules 170 and 175.

The world-level representation-based interaction rules 170 can represent representational authenticity requirements 127 defined for elements of the virtual world. The age representational authenticity requirement 127 for the children's reading area of the library can be an example of a world-level representation-based interaction rules 170 because this rule is applied to all users 105 who attempt to interact with this specific element of the virtual world. Creation and/or modification of world-level representation-based interaction rules 170 can be limited to administrators of the virtual world environment 150.

The user profile data 165 can correspond to the data kept by the virtual world environment 150 that is specific to a user 105. In addition to containing standard user configuration data, the user profile data 165 can also store the user representational authenticity data 145, the user-level representation-based interaction rules 175, and the user representational authenticity score 180 of the user 105.

The user representational authenticity data 145 can be a copy of the user representational authenticity data 145 collected by the data collection agency 130. The user profile data 165 for a user 105 can include multiple sets of user representational authenticity data 145, with each set of user representational authenticity data 145 representing a separate data collection session. That is, a user 105 can have user representational authenticity data 145 collected over time that can document their physical changes in appearance.

For example, members of a weight loss support group in the virtual world can sign-up to have their user representational authenticity data 145 collected every two months so the group members can see changes in each other's virtual representations 120. The virtual world environment 150 can include options that can be configured to allow users 105 to see a visual progression of the changes captured in the user representational authenticity data 145.

The user-level representation-based interaction rules 175 can represent user-configurable options allowed within the virtual world environment 150 for the use and/or presentation of a user's 105 user representational authenticity data 145. The user representational authenticity score 180 stored in the user profile data 165 can correspond to the value calculated by the representational authenticity handler 155.

Network 185 can include any hardware/software/and firmware necessary to convey data encoded within carrier waves. Data can be contained within analog or digital signals and conveyed though data or voice channels. Network 185 can include local components and data pathways necessary for communications to be exchanged among computing device components and between integrated device components and peripheral devices. Network 185 can also include network equipment, such as routers, data lines, hubs, and intermediary servers which together form a data network, such as the Internet. Network 185 can also include circuit-based communication components and mobile communication components, such as telephony switches, modems, cellular communication towers, and the like. Network 185 can include line based and/or wireless communication pathways.

As used herein, presented data stores 140 and 160 can be a physical or virtual storage space configured to store digital information. Data stores 140 and 160 can be physically implemented within any type of hardware including, but not limited to, a magnetic disk, an optical disk, a semiconductor memory, a digitally encoded plastic memory, a holographic memory, or any other recording medium. Data stores 140 and 160 can be a stand-alone storage unit as well as a storage unit formed from a plurality of physical devices. Additionally, information can be stored within data stores 140 and 160 in a variety of manners. For example, information can be stored within a database structure or can be stored within one or more files of a file storage system, where each file may or may not be indexed for information searching purposes. Further, data stores 140 and/or 160 can utilize one or more encryption mechanisms to protect stored information from unauthorized access.

Figure 2:
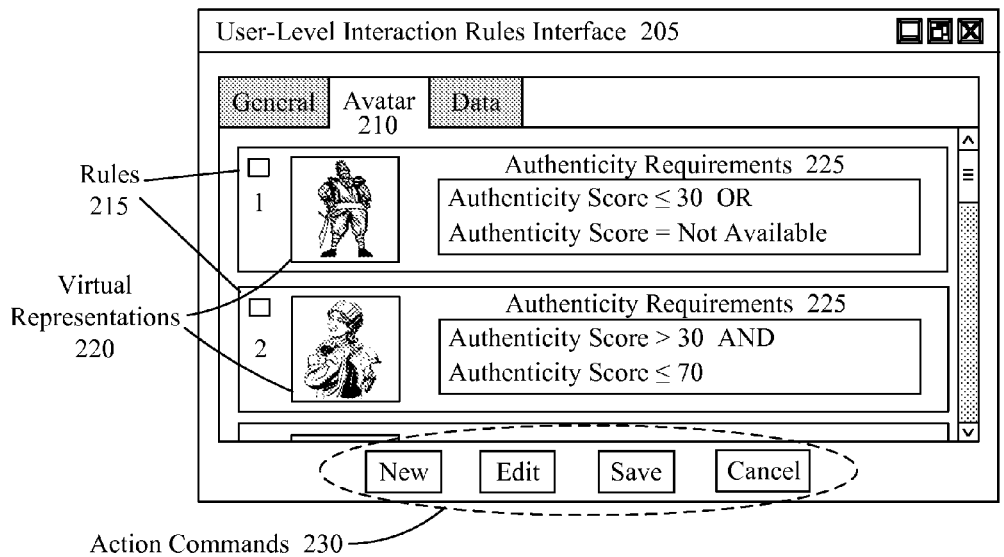
FIG. 2 is a collection of graphical user interfaces (GUIs) that can be used for the configuration of user-level representation-based interaction rules in accordance with an embodiment of the inventive arrangements disclosed herein.
Figure 2:
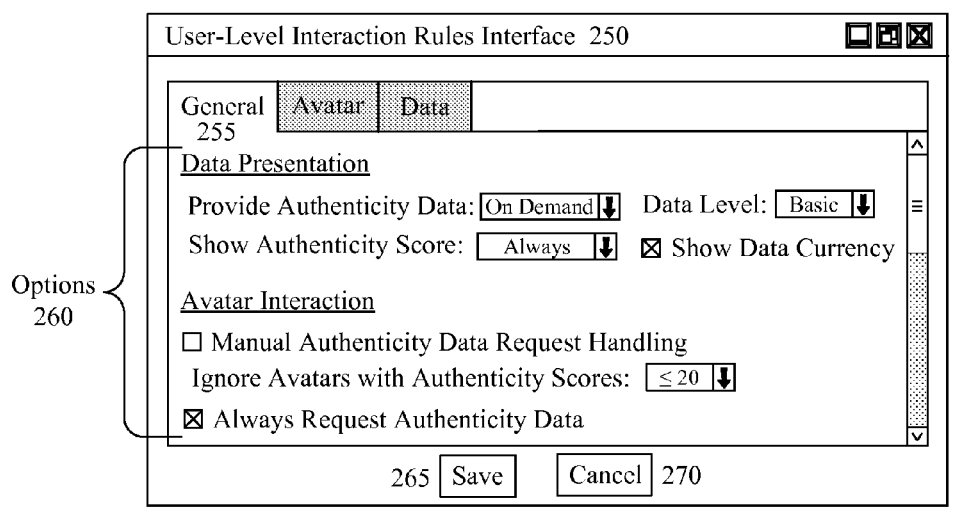

FIG. 2 is a collection 200 of graphical user interfaces (GUIs) 205 and 250 that can be used for the configuration of user-level representation-based interaction rules in accordance with embodiments of the inventive arrangements disclosed herein. GUIs 205 and 250 can be utilized within the context of system 100 or any other system that incorporates the use of representational authenticity for the conduction of interactions within a virtual world environment.

It is important to note that the GUIs 205 and 250 of collection 200 are for illustrative purposes only, and are not intended to present a comprehensive implementation of this aspect of the present invention.

GUIs 205 and 250 of collection 200 can represent views of the virtual world interface 115 that can allow user-configuration of the user-level representation-based interaction rules 175 of system 100. As shown in this example, GUI 205 illustrates the avatar tab 210 of the interface where a user can define rules 215 representing the user's preferences for displaying their virtual representation 215 or avatar.

Each rule 215 shown in GUI 205 can be thought of as a graphical representation of a conditional statement of the general format "if these authenticity requirements 225 are met, display this virtual representation 220". The virtual representations 220 can be created by the user and/or created by the virtual world environment based upon the user's collected user representational authenticity data.

The authenticity requirements 225 can represent the user-defined conditions for presenting the corresponding virtual representation 220 in the virtual world environment. The authenticity requirements 225 can utilize known elements and/or properties of user representational authenticity data, such as height, age, and user representational authenticity score. Additionally, the GUI 205 can be configured to allow the use of BOOLEAN logic when defining authenticity requirements 225.

In this example, rule '1' 215 can be interpreted as stating that other users in the virtual world environment who have an authenticity score less than or equal to thirty OR an authenticity score having a value of "Not Available" will view the user as a male barbarian avatar 220. Rule '2' 215 can allow other users whose authenticity score is greater than thirty AND less than or equal to seventy to view the user as a female avatar carrying ice skates 220.

Thus, a user can tailor the appearance of their avatar 220 based upon the level of representation authenticity of other users. This can allow a user to present a more accurate virtual representation 220 of themselves in situations where other users are presenting themselves at a comparable level of authenticity. Additionally, this means of configuration can also the user to present a more anonymous or guarded virtual representation 220 to those having little or an unknown level of representation authenticity.

Additionally, the avatar tab 210 of GUI 205 can include action commands 230 to allow the user to perform specified actions, such as adding or editing a rule 215. The action commands 230 can be presented to the user for selection in a variety of ways, including, but not limited to, GUI buttons, context menu items, pop-up windows, menu commands, and the like.

GUI 250 can illustrate the general tab 255 of the interface where a user can configure options 260 representing the user's preferences regarding for the general handling of their user representational authenticity data. As shown in this example, the options 260 presented in GUI 250 have been configured to provide other users with authenticity data on an "On Demand" basis with a data level of basic and its currency. The user's authenticity score is always shown to other users. Additionally, the user wishes to always request the authenticity data of other users as well as ignoring other users who have authenticity scores less than or equal to twenty.

The general tab 255 of GUI 250 can also include a save button 265 for capturing changes to the options 260 as well as a cancel button 270 for undoing unsaved changes to the options 260.

Figure 3:
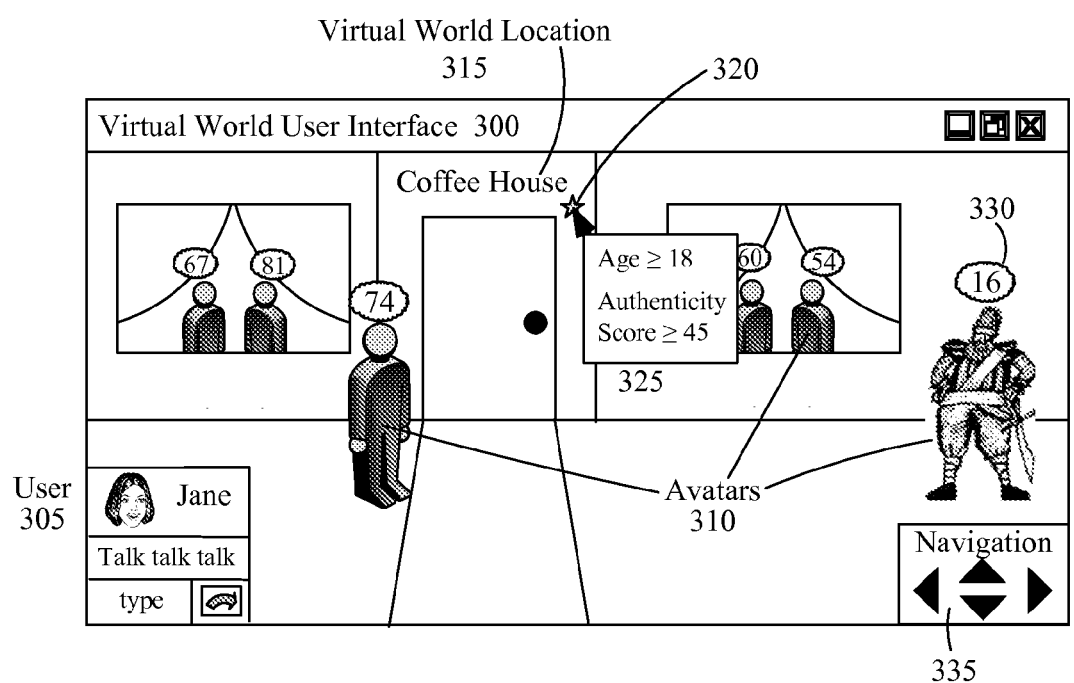
FIG. 3 is an illustration of a user interface for a virtual world environment that utilizes representation authenticity in accordance with an embodiment of the inventive arrangements disclosed herein.

FIG. 3 is an illustration of a user interface 300 for a virtual world environment that utilizes representation authenticity in accordance with embodiments of the inventive arrangements disclosed herein. The user interface 300 can be utilized within the context of system 100 and/or in conjunction with the GUIs 205 and 250 of collection 200.

The virtual world user interface 300 can provide the user 305 with the functionalities for participating in the presented graphical virtual world, such as the navigation buttons 335 for moving through the virtual world. The user 305 can interact with the avatars 310 of other users 305 and or virtual world locations 315, such as the coffee house shown in this example.

In addition to the basic presentation of the virtual world, the user interface 300 can be configured to present elements specific to the use of user representational authenticity data. As shown in this example, each avatar 310 shown in the user interface 300 can have the value for their user representational authenticity score 330 presented in a bubble floating above their head.

It should be noted that the presentation of a user's 305 user representational authenticity score 330 can vary based upon the implementation within the virtual world environment and/or the preferences defined by a user's 305 user-level representation-based interaction rules.

The virtual world location 315 can include a visual indicator 320 that can denote the existence of entry requirements 325 for the location 315. The entry requirements 325 can correspond to one or more world-level representation-based interaction rules defined for the virtual world location 315. The user 305 can then perform an action to access the entry requirements 325.

In this example, a star is used as the visual indicator 320 and hovering over the star 320 with the mouse pointer presents a list of the entry requirements 325. Only users 305 whose user representational authenticity data indicates an age greater than or equal to eighteen and whose calculated user representational authenticity score 330 is greater than or equal to forty-five are allowed to enter the coffee house 315. It can then be logically follow that the avatars 310 already inside the coffee house 315 meet the entry requirements 325.

Further, the barbarian avatar 310 with a user representational authenticity score 330 of sixteen cannot gain entry to the coffee house 315. The gray avatar 310 with the user representational authenticity score 330 of seventy-four, however, can only gain entry if they have been verified to eighteen years of age or older.

Figure 4:
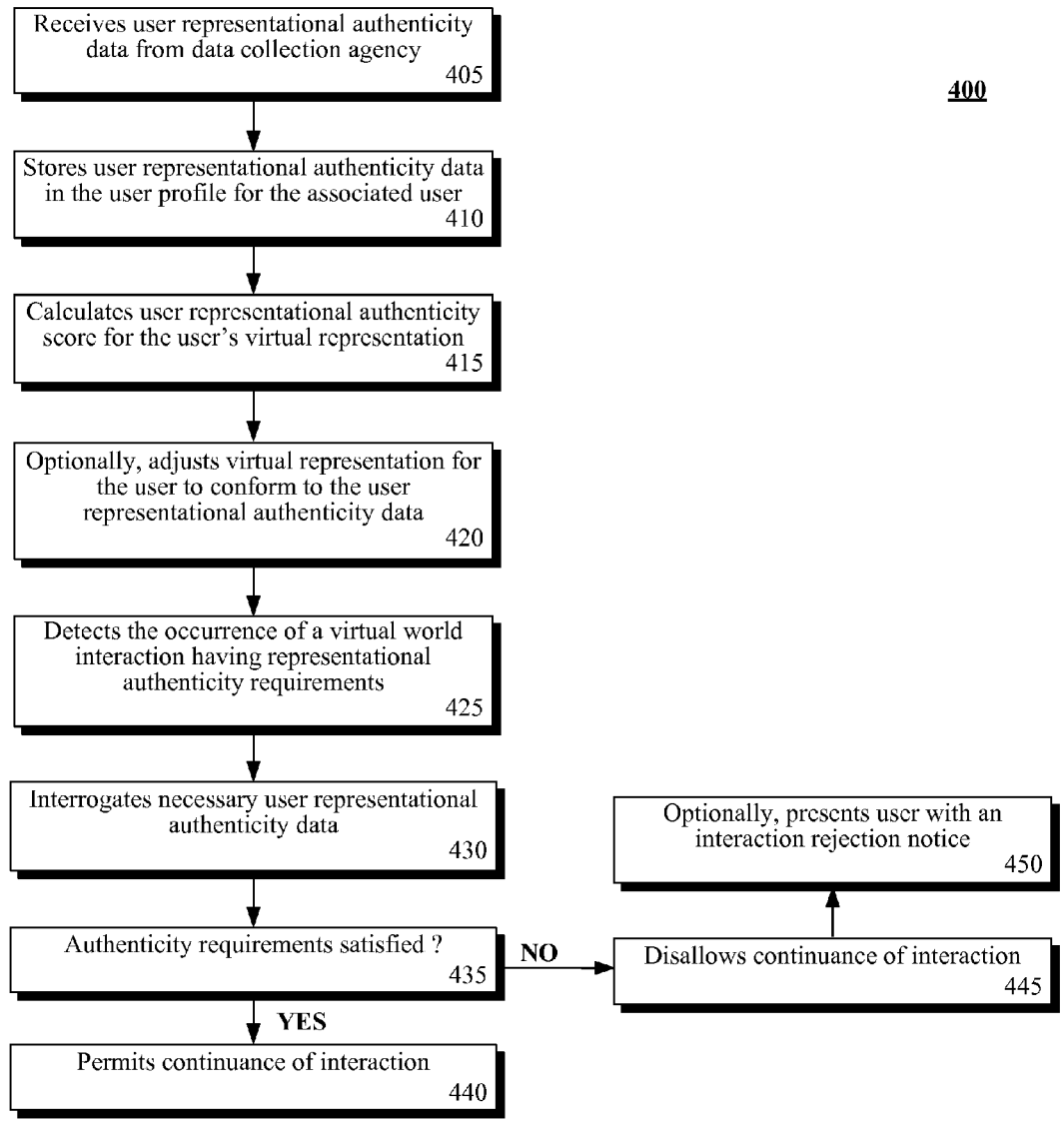
FIG. 4 is a flow chart of a method that describes the use of user representational authenticity data in virtual world interactions in accordance with embodiments of the inventive arrangements disclosed herein.

FIG. 4 is a flow chart of a method 400 that describes the use of user representational authenticity data in virtual world interactions in accordance with an embodiment of the inventive arrangements disclosed herein. Method 400 can be performed in the context of system 100 and/or utilizing the graphical user interfaces (GUIs) 205, 250, and 300 of FIGS. 2 and 3.

Method 400 can begin with step 405 where the virtual world environment can receive user representational authenticity data. The received user representational authenticity data can be stored in the user profile for the associated user in step 410. In step 415, a user representational authenticity score can be calculated for the virtual representation of the user. Step 415 can be automatically performed by the representational authenticity handler of the virtual world environment.

The virtual representation of the user can be optionally adjusted to conform to the user representational authenticity data in step 420. In step 425, the occurrence of an interaction having representational authenticity requirements can be detected.

The necessary user representational authenticity data can be interrogated in step 430. In step 435, it can be determined if the representational authenticity requirements have been satisfied. When the representational authenticity requirements have been satisfied, the interaction can be permitted to continue in step 440.

When the representational authenticity requirements have not been satisfied, step 445 can execute where continuation of the interaction can stopped. The user can be optionally presented with an interaction rejection notice in step 450.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system that incorporates representational authenticity into virtual world interactions comprising:
    a plurality of user representational authenticity data describing one or more physical characteristics of a human user, wherein said one or more physical characteristics are quantifiable utilizing standardized measurement techniques; and
    a virtual world computing system including one or more processors, configured to adjudicate conduction of interactions performed by a virtual representation of the human user within a virtual world environment utilizing a representational authenticity score for the virtual representation of the human user defining a degree of resemblance between the virtual representation and the human user, wherein the representational authenticity score is calculated based at least in part on the plurality of user representational authenticity data.

2. The system of claim 1, wherein the plurality of user representational authenticity data is collected by a third-party agency external to the virtual world computing system, wherein said human user physically presents themselves and at least one item of identification at the third-party agency.

3. The system of claim 1, wherein the virtual world computing system further comprises:
    a plurality of user-level representation-based interaction rules describing user-defined preferences to be used by the virtual world computing system when utilizing the plurality of user representational authenticity data for interactions within the virtual world environment;
    a plurality of world-level representation-based interaction rules defining representational authenticity requirements for specified locations within the virtual world environment, wherein a failure by the plurality of user representational authenticity data to satisfy a world-level representation-based interaction rule for a specified location restricts access to said specified location; and
    a representational authenticity handler configured to manage interactions conducted by the virtual representation of the human user within the virtual world environment that requires use of the plurality of user representational authenticity data and at least one of the plurality of user-level representation-based interaction rules and the plurality of world-level authenticity-based interaction rules.

4. The system of claim 3, wherein the representational authenticity handler calculates the representational authenticity score for each virtual representation of the human user, wherein the representational authenticity score is utilized as a conditional parameter for at least one of a user-level representation-based interaction rule and a world-level representation-based interaction rule.

5. The system of claim 4, wherein the representational authenticity score is visually presented for viewing by other users within the virtual world environment.

6. The system of claim 3, wherein the representational authenticity handler creates the virtual representation of the human user within the virtual world environment based upon the plurality of user representational authenticity data.

7. The system of claim 3, wherein the plurality of user-level representation-based interaction rules influences at least one of access privileges to the plurality of user representational authenticity data, presentation of the virtual representation of the human user, transmission of the plurality of user representational authenticity data to other human users, and requesting user representational authenticity data from other human users.

8. The system of claim 3, wherein functions of the representational authenticity handler are provided as a service within the virtual world environment, wherein said virtual world environment utilizes a service-oriented architecture (SOA).

9. The system of claim 1, wherein the plurality of user representational authenticity data comprises at least one of a height, a weight, an eye color, a hair color, a type and location of body embellishments, an age, and a set of physical body measurements.

10. The system of claim 1, wherein the plurality of user representational authenticity data is stored within the virtual world computing system as an element of a user profile associated with the human user.

11. A method that utilizes representational authenticity data when handling virtual world interactions comprising:
   identifying, via one or more processors executing computer program instructions that are stored in at least one memory, an interaction of a virtual representation of a human user within a virtual world environment, wherein said interaction utilizes at least one representational authenticity requirement based upon at least one of user representational authenticity data and a representational authenticity score defining a degree of resemblance between the virtual representation and the human user, wherein the user representational authenticity data describes one or more quantifiable physical characteristic of the human user, and, wherein the interaction is conducted with at least one of the virtual representation of a secondary human user and a distinct location of the virtual world environment;
   accessing, via one or more processors executing computer program instructions that are stored in at least one memory, the user representational authenticity data associated with the human user, wherein said user representational authenticity data is stored in a user profile within the virtual world environment;
   determining, via one or more processors executing computer program instructions that are stored in at least one memory, satisfaction of the at least one representational authenticity requirement by the user representational authenticity data; and
   when the at least one representational authenticity requirement is satisfied, permitting, via one or more processors executing computer program instructions that are stored in at least one memory, conduction of the interaction by the virtual representation of the human user within the virtual world environment.

12. The method of claim 11, further comprising: when the at least one representational authenticity requirement is unsatisfied, prohibiting conduction of the interaction by the virtual representation of the human user within the virtual world environment.

13. The method of claim 11, further comprising: presenting an interaction rejection notice to the human user within an interface of the virtual world environment, wherein said interaction rejection notice provides noncompliance information for the interaction.

14. The method of claim 11, wherein the accessing of the user representational authenticity data and the determining of the satisfaction of the representational authenticity requirement is performed by a representational authenticity handler component of the virtual world environment.

15. The method of claim 11, further comprising: receiving the user representational authenticity data for the human user from a third-party agency, wherein said user representational authenticity data is verified during an in-person meeting between the third-party agency and the human user; and storing the received user representational authenticity data in the user profile associated with the human user.

16. The method of claim 11, wherein the at least one representational authenticity requirement is defined as at least one of a world-level representation-based interaction rule of the virtual world environment and a user-level representation-based interaction rule of the human user.

17. A virtual world environment that utilizes representational authenticity data when handling virtual world interactions comprising:
   a plurality of user representational authenticity data describing one or more physical characteristics of a human user, wherein said one or more physical characteristics are quantifiable utilizing standardized measurement techniques;
   a virtual world computing system including one or more processors, configured to present a virtual world environment in which a virtual representation of the human user interacts with at least one of the virtual representation of a secondary human user and the virtual world environment utilizing a representational authenticity score for the virtual representation of the human user defining a degree of resemblance between the virtual representation and the human user, wherein the representational authenticity score is calculated based at least in part on the plurality of user representational authenticity data and
   a representational authenticity handler configured to utilize the plurality of user representational authenticity data to determine which interactions the virtual representation of the human user is allowed to perform within the virtual world environment;
   a plurality of user-level representation-based interaction rules describing user-defined preferences for utilizing the plurality of user representational authenticity data when the virtual representation of the human user performs interactions within the virtual world environment; and
   a user interface configured to permit user-configuration of the plurality of user-level representation-based interaction rules for use by the representational authenticity handler.

18. The virtual world environment of claim 17, wherein the representational authenticity handler is further configured to manage the virtual representation of the human user depending upon user representational authenticity data of at least one other human user.

19. The virtual world environment of claim 17, wherein the virtual world computing system further comprises:
   a plurality of world-level representation-based interaction rules defining representational authenticity requirements for specified locations within the virtual world environment, wherein a failure by the plurality of user representational authenticity data to satisfy a world-level representation-based interaction rule for a specified location restricts access to said specified location for the virtual representation of the human user.

20. The virtual world environment of claim 17, wherein the representational authenticity handler calculates a representational authenticity score for each virtual representation of the human user contained within the virtual world computing system, wherein said representational authenticity score defines a degree of resemblance between the virtual representation and the human user.

* * * * *